United States Patent [19]
Welburn

[11] 4,385,250
[45] May 24, 1983

[54] SYNCHRONOUS MOTOR HAVING GRADUAL EDGE EFFECT
[75] Inventor: Ross D. Welburn, Santa Rosa, Calif.
[73] Assignee: Compumotor Corporation, Petaluma, Calif.
[21] Appl. No.: 224,263
[22] Filed: Jan. 12, 1981
[51] Int. Cl.³ .......................................... H02K 19/00
[52] U.S. Cl. .............................. 310/162; 310/49 R; 310/261
[58] Field of Search .................... 310/49, 162–165, 310/261

[56] References Cited
U.S. PATENT DOCUMENTS
4,112,319 9/1978 Field ................................... 310/49

Primary Examiner—Donovan F. Duggan
Attorney, Agent, or Firm—Flehr, Hohbach, Test, Albritton & Herbert

[57] ABSTRACT

A synchronous motor has a gradual edge effect as rotor teeth align with stator teeth by varying the width of the stator teeth. The edges of uniformly spaced rotor teeth of equal width will align with edges of the widest stator teeth before aligning with the edges of the narrower stator teeth. The change in torque associated with edge alignment of the rotor and stator teeth is spread in time and position with less compounding of the changing torque. More uniform torque and smoother, quieter motor operation results.

10 Claims, 5 Drawing Figures

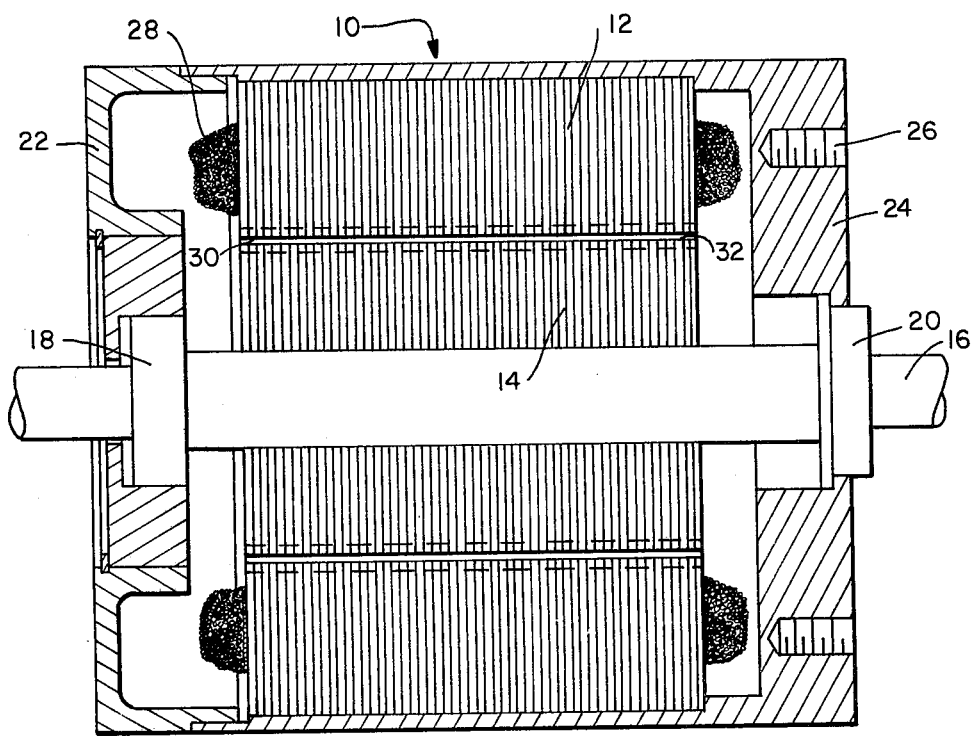
FIG.—1
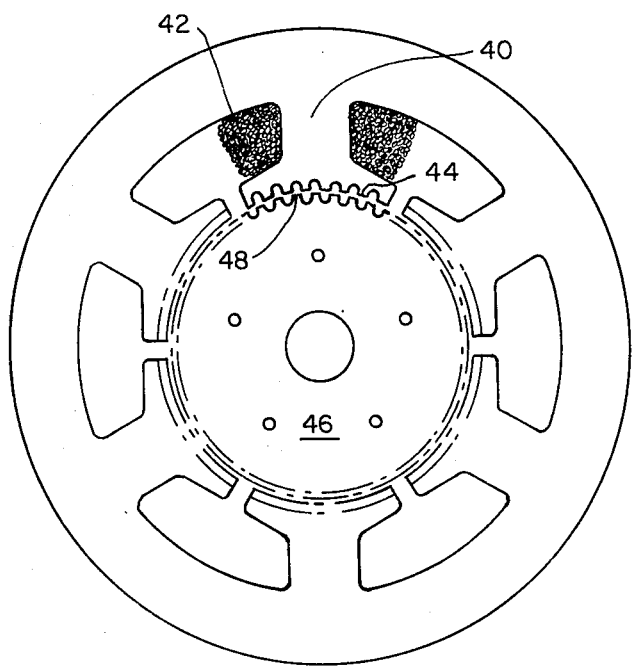
FIG.—2

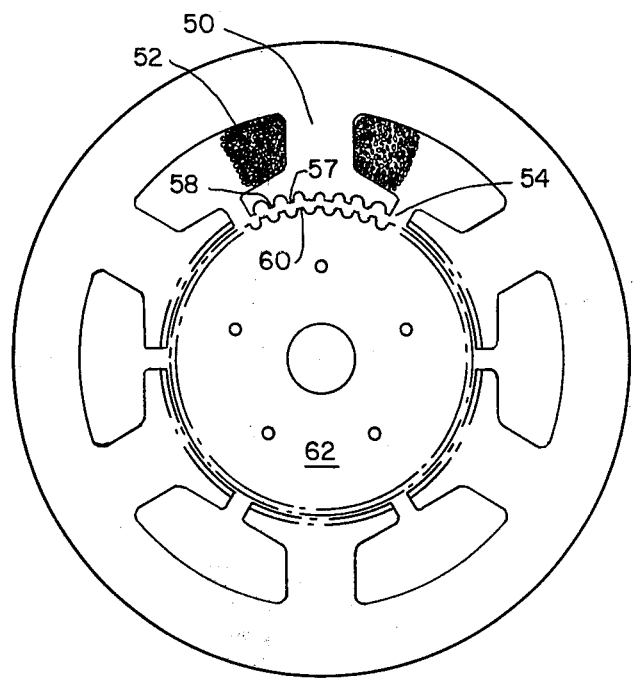
FIG.—4
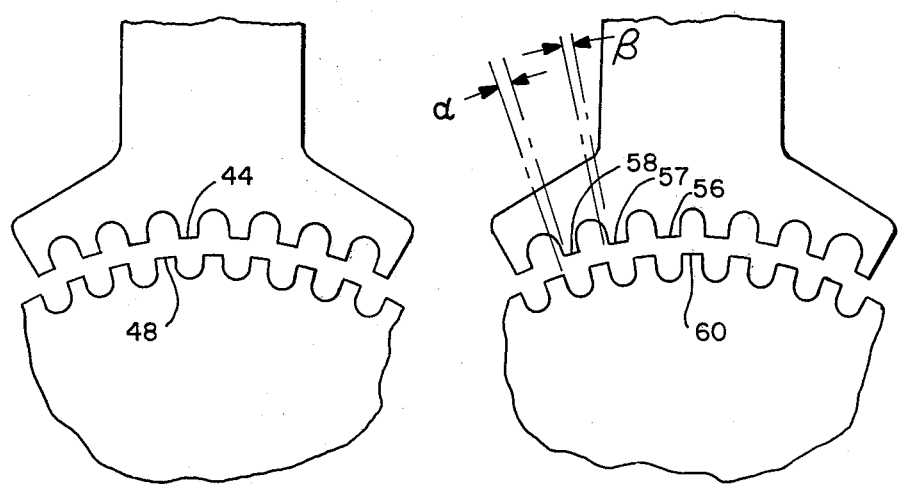
FIG.—3   FIG.—5

SYNCHRONOUS MOTOR HAVING GRADUAL EDGE EFFECT

This invention relates generally to variable reluctance synchronous motors, and more particularly the invention relates to a synchronous motor rotor and stator construction.

The rotary variable reluctance synchronous motor or stepping motor has many applications where a driven element must be rotated in increments or steps of precisely uniform amounts. The stepper motor includes an annular stator portion having a plurality of poles and a cylindrical rotor portion which rotates within a stator. The pole faces of the stator and the rotor surface have a plurality of teeth while define magnetic paths as the rotor teeth align with the stator teeth.

Numerous control circuits have been designed which respond to the direction and speed for rate input signals and provide a control signal to power amplifiers which energize the field winding of the stator and drive the motor. Further, drive circuitry is known which is responsive to synthesized control signals for providing field excitation current which is distorted to match the magnetic characteristics of the particular synchronous motor and thus provide more uniform torque and smoother operation. See for example copending U.S. patent application Ser. No. 067,363, filed Aug. 17, 1979, now U.S. Pat. No. 4,284,940 for Electrical Wave Synthesizer for Controlling an Electric Motor, and copending application Ser. No. 067,364, filed Aug. 17, 1979, now U.S. Pat. No. 4,306,181 for Drive Circuitry for Electric Motor, both applications being assigned to Compumotor Corporation, the present assignee.

As the rotor rotates within the stator the rotor and stator both experience a higher flux density at the edge of each tooth because of "edge effect". Thus, as a stator tooth and a rotor tooth move towards alignment the torque of the motor changes faster when the edges of the teeth come into alignment than when full alignment or overlap of the teeth occurs. The greater change in torque includes many harmonics which causes shaft vibration and sets up magnetostrictive flexing in the frame of the motor. Since the teeth of the rotor and the teeth of the stator typically have the same spacing and width, the edge effect occurs at substantially the same time for all energized teeth, thus compounding the detrimental effects thereof.

Accordingly an object of the present invention is a synchronous motor having smoother and quieter operation.

Another object of the invention is a method of operating a synchronous motor to reduce shaft vibration.

Still another object of the invention is a synchronous motor having a more uniform torque.

Yet another object of the invention is a synchronous motor having a wider operating range.

A feature of the invention is the provision of pole surfaces in the stator of a synchronous motor having teeth disposed whereby edge alignment of the teeth with the teeth of a rotor as the rotor rotates within the stator occurs first with stator teeth near the center of a pole.

Briefly, in accordance with a preferred embodiment of the invention a synchronous motor includes a stator portion having a plurality of poles with each pole having a surface including a first plurality of teeth, the width of the stator teeth being wider in the center of the pole than at the edges of the pole. The rotor portion is rotatably positioned within the stator portion with the rotor portion having a second plurality of teeth with the second plurality of teeth being of equal width and positioned to align with the stator teeth as the rotor portion rotates in the stator portion. Thus, the "edge effect" is spread in time or angular position as the rotor teeth align with the stator teeth and consequently the compounding of the deleterious effects is reduced.

The invention and objects and features thereof will be more readily apparent from the following detailed description and appended claims when taken with the drawing, in which:

FIG. 1 is a side view of a synchronous motor shown partly in section.

FIG. 2 is a section view of the motor of FIG. 1 taken along the line 2—2 in accordance with the prior art.

FIG. 3 is an enlarged view of a portion of FIG. 2.

FIG. 4 is a side view in section of the motor of FIG. 2 taken along the line 2—2 in accordance with the present invention.

FIG. 5 is an enlarged view of a portion of FIG. 4.

Referring now to the drawings, FIG. 1 is a side view partially in section of a synchronous motor. Typically, the motor includes a housing 10 in which is mounted an annular stator 12 with a cylindrical rotor 14 mounted on a shaft 16 for rotation within the stator 12. Bearings 18 and 20 are mounted in the ends 22 and 24 which are fastened to housing 10 by means of a bolt 26.

The stator 12 comprises a plurality of stacked laminations of permeable iron with a plurality of coils such as coil 28 would about the laminations to define magnetic poles in the stator. As will be described further hereinbelow the face of each pole comprises a plurality of teeth illustrated generally by the dotted line 30. The cylindrical rotor 14 comprises a plurality of stacked laminations with the outer surface of the rotor having a plurality of teeth illustrated generally by the dotted line 32.

FIG. 2 is a section view of the motor of FIG. 1 taken along the line 2—2 in accordance with the prior art. The top pole 40 of the stator includes a winding 42 wound about the laminations and an arcuate pole surface comprising a plurality of teeth 44. To simplify illustration only eight teeth are shown on the pole surface, however, it will be appreciated that the number of teeth can be greater or lesser in number. In accordance with the prior art the teeth are uniformly spaced and of uniform width.

The outer surface of rotor 46 also includes a plurality of teeth 48. In accordance with the prior art the teeth 48 are uniformly spaced with the same width as the teeth 44 of the stator. Accordingly, as the rotor 46 rotates within the stator 40 the teeth 48 come into alignment with the teeth 44 of the stator concurrently. This is illustrated in FIG. 3 which is an enlarged view of a portion of FIG. 2 showing the stator teeth 44 and a portion of the rotor teeth 48. Assuming that the rotor is rotating clockwise it will be noted by the center lines that the leading edges of the rotor teeth 48 align with the leading edges of the stator teeth 44 at essentially the same time. Since the torque on the rotor changes faster when the edges of the teeth are coming into alignment as opposed to full alignment of the teeth, the greater torque developed from the leading edges of the teeth compound and the resulting non-uniform torque causes shaft vibration.

FIG. 4 is a side view in section taken along the line 2—2 of FIG. 1 of a motor in accordance with the present invention. The pole 50 is similar to pole 40 of FIG. 2 and includes winding 52 with the arcuate face of the pole including the teeth 54. Again, for simplicity of illustration only eight teeth are shown at the surface of the pole, but it will be understood that the number of teeth can be greater or lesser. In accordance with a preferred embodiment, the teeth of the stator surface are equally spaced but the inner teeth of each pole such as tooth 56 is wider than the outer teeth such as teeth 57 and 58. The teeth 60 of the rotor 62 are again uniformly spaced about the outer surface of the rotor with the teeth having uniform width.

Thus, in accordance with the invention the rapid change in torque experienced when the leading edge of a rotor tooth aligns with the leading edge of a stator tooth is distributed timewise whereby the leading edges of the teeth do not align concurrently. This is illustrated in FIG. 5 which is an enlarged portion of FIG. 4 in which a leading edge of a rotor tooth 60 is in alignment with the leading edge of stator tooth 56 as the rotor rotates clockwise. However, it will be noted that since the stator tooth 56 is wider than the stator teeth 57 and 58, the rotor teeth 60 moving towards the stator teeth 57 and 58 are still out of alignment. By progressively decreasing the width of the stator teeth from the innermost teeth to the outermost teeth, as illustrated, the alignment of the leading edges of the rotor teeth with the leading edges of the stator teeth is staggered in space and hence in time. This is illustrated by the angles $\alpha$ and $\beta$ between the leading edges of rotor teeth and the leading edges of the stator teeth 57 and 58 when the leading edge of the widest tooth 56 is aligned with the leading edge of rotor tooth 60. By varying the width of the stator teeth the angle $\alpha$ will be greater than the angle $\beta$ and thus the leading edge of tooth 57 will align with the leading edge of a rotor tooth after the alignment of the leading edge of tooth 56 but before the alignment of the tooth 58.

By disposing the plurality of teeth of each pole face of the stator with respect to the plurality of teeth on the rotor whereby edge alignment of the stator teeth with the rotor teeth is distributed over a time period, the harmonics associated with the edge alignment are reduced and more uniform torque is realized as the rotor rotates in the stator. Further, with reduced harmonics generated by the edge effect, the synthesized wave for driving the motor can more readily compensate for the remaining harmonic content and thus further smooth operation of the motor.

The graduated tooth design is superior to the standard fixed tooth width because it can facilitate a wider magnetic operating range. For the highest torque, the object is to keep the teeth as wide as possible while still operating in heavy magnetic saturation. The tooth width is selected based on the operating flux level in the motor so that the lower the flux, the thinner the tooth should be for optimum torque. This new structure can operate over a wider range of flux levels in the motor because of the varying tooth widths.

The gradual edge effect in accordance with the invention is preferably realized by varying the width of the stator teeth, as described. However, the gradual edge effect can be realized in other ways such as by changing the spacing of constant width stator teeth. Thus, while the invention has been described with reference to a specific embodiment, the description is illustrative of the embodiment and is not to be construed as limiting the embodiment. Various modifications and applications may occur to those skilled in the art without departing from the true spirit and scope of the invention as defined by the appended claims.

What is claimed is:

1. A synchronous motor comprising
a stator portion having a plurality of poles with each pole having a surface including a first plurality of equally spaced teeth, the width of said teeth being wider in the center of each pole than at the edges of each pole, and
a rotor portion rotatably positioned within said stator portion, said rotor portion having a surface with a second plurality of equally spaced teeth, said second plurality of teeth being of equal width and positioned to align with said first plurality of teeth as said rotor portion rotates in said stator portion.

2. A synchronous motor as defined by claim 1 wherein the number of said second plurality of teeth equals the number of teeth of said stator portion.

3. A synchronous motor as defined by claim 1 or 2 wherein said stator portion includes a plurality of stacked laminations and a plurality of coils wound on said stacked laminations defining said plurality of poles.

4. A synchronous motor as defined by claim 3 wherein said rotor portion includes a plurality of stacked laminations.

5. A synchronous motor comprising an annular stator having a plurality of inwardly extending poles with each pole face defined by an undulating surface with a first plurality of equally spaced teeth,
a cylindrical rotor having a periphery defined by an undulating surface with a second plurality of uniformly spaced teeth,
said first plurality of teeth being disposed whereby edge alignment of said second plurality of teeth with said first plurality of teeth as said rotor rotates within said stator occurs first with teeth of said first plurality near the center of a pole.

6. A synchronous motor as defined by claim 5 wherein in said first plurality of teeth, near the center of a pole are wider than teeth near the edge of a pole.

7. A synchronous motor as defined by claim 6 wherein said second plurality of teeth are of uniform width.

8. A synchronous motor as defined by claim 7 wherein the number of teeth of said stator equals the number of said second plurality of teeth.

9. In a synchronous motor having an annular stator with a plurality of inwardly extending poles and with the pole faces having a first plurality of equally spaced teeth and a cylindrical rotor having a peripheral surface with a second plurality of equally spaced teeth, a method of operating said motor to reduce shaft vibration comprising the step of disposing said first plurality of teeth with respect to said second plurality of teeth whereby edge alignment of said first plurality of teeth and said plurality of teeth as said rotor rotates within said stator occurs first with teeth of said first plurality near the center of a pole.

10. The method of operating a synchronous motor to reduce shaft vibration as defined by claim 9 wherein said step of disposing said first plurality of teeth with respect to said second plurality of teeth includes providing teeth of said first plurality which are wider near the center of a pole than at the edge of a pole.

* * * * *